Patented Jan. 22, 1929.

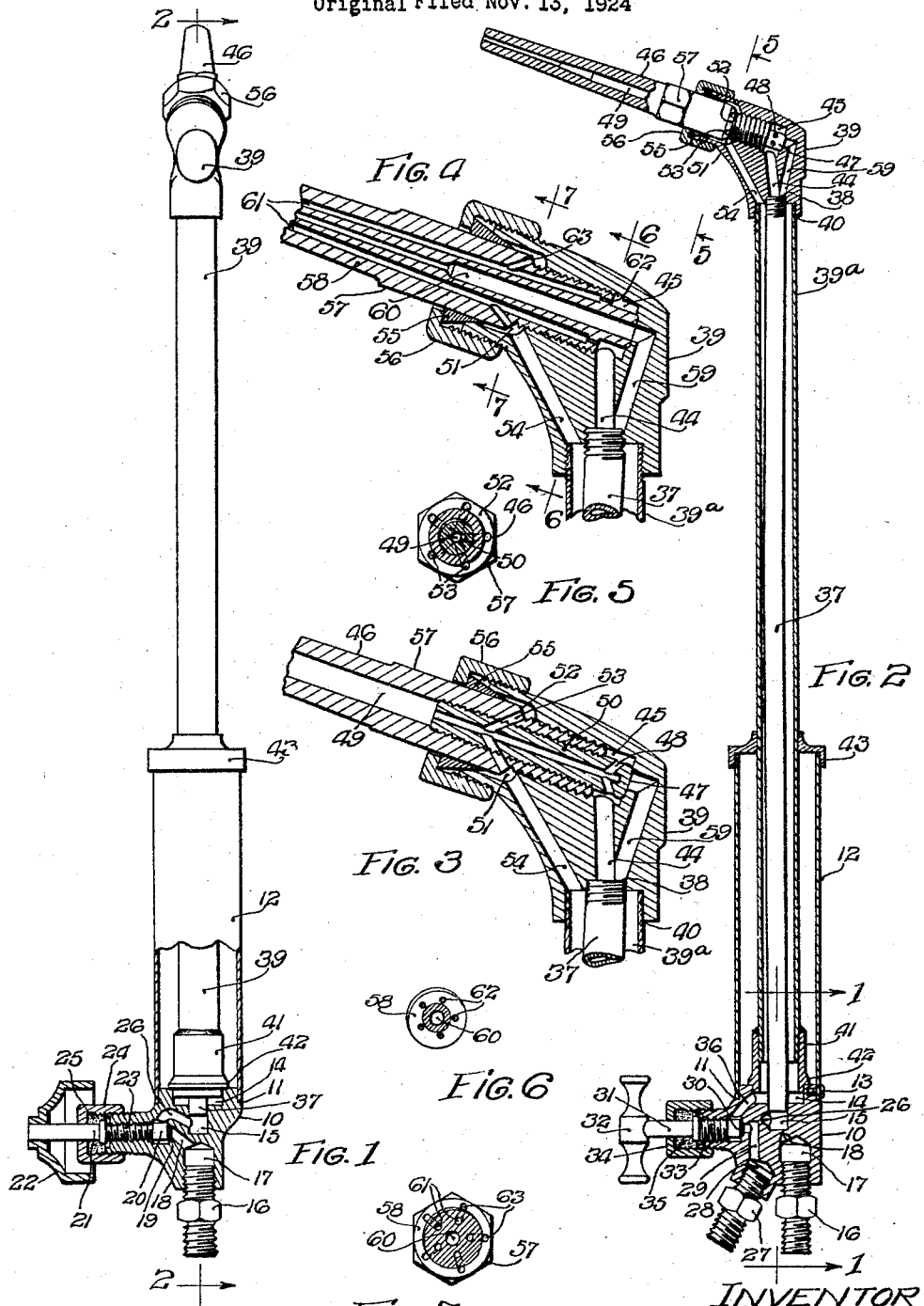

1,699,851

UNITED STATES PATENT OFFICE.

ROBERT D. McINTOSH, OF RIVER FOREST, ILLINOIS, ASSIGNOR TO THE IMPERIAL BRASS MANUFACTURING COMPANY, OF CHICAGO, ILLINOIS, A CORPORATION OF ILLINOIS.

WELDING TORCH.

Application filed November 13, 1924, Serial No. 749,737. Renewed June 22, 1928.

My invention is concerned with welding torches, and is designed to produce an extremely simple, effective and cheaply manufactured device of the class described, and to this end I have devised a simple and novel combination of elements which will be hereinafter fully described and the novel features and combination thereof particularly pointed out in the claims. It is also designed to produce a device in which a cutting tip can be substituted, and cutting as well as welding performed.

To illustrate my invention, I annex hereto a sheet of drawings in which the same reference characters are used to designate identical parts in all the figures, of which Figure 1 is a top plan view of a torch embodying my invention with the valve casing thereof in section on the line 1—1 of Fig. 2;

Fig. 2 is a central vertical section on the line 2—2 of Fig. 1;

Fig. 3 is a detail of the head block and associated elements, as seen in Fig. 2, but on an enlarged scale;

Fig. 4 is a view similar to Fig. 3 but showing a cutting tip in place; and

Fig. 5 is an enlarged detail of the welding tip in section on the line 5—5 of Fig. 3; and Figs. 6 and 7 are details of the cutting tip in cross-section on the lines 6—6 and 7—7 of Fig. 4.

In carrying out my invention, I employ a casting 10 forming a valve casing, and on one end of this casting I locate an annular shoulder 11 upon which one end of the handle 12 is secured by the screw 13, and concentrically within this shoulder I locate the outlet recess 14 for the acetylene gas, and concentrically with this outlet opening 14 I locate the smaller outlet opening 15 for the oxygen. The oxygen is led into the casting 10 from the connection 16 which is threaded into the inlet end 17 of the oxygen passage, which inlet 17 is connected with the outlet 15, as best seen in Fig. 1, by the short bore 18 and terminating in the valve seat 19 with which co-operates the end 20 of the valve stem 21, which is provided with the customary handle 22, and which is threaded into the projection 23 provided for that purpose. A gland nut 24 is threaded on to the projection 23 and serves to enclose and compress the customary packing 25 employed to make the valve air-tight. Another short bore 26 in the valve casting 10 leads from the valve opening 19 to the oxygen outlet 15. The acetylene is led through the connection 27 threaded into the acetylene inlet recess 28, which is connected by the bore 29, as seen in Fig. 2, with the valve seat 30 for the valve stem 31, which is provided with the customary handle 32, and is threaded in the projection 33 employed for that purpose. A gland nut 34 is threaded on to the projection and serves to hold and compress the packing 35 by which the valve is rendered gas-tight. A bore 36 leads from the valve seat 30 to the acetylene outlet aperture 14.

Extending into the oxygen outlet 15 is a small pipe or tube 37, which is preferably soldered in said recess 15, but which might be threaded therein. The other end of the tube 37 is secured, preferably by threading, in the inlet recess 38 formed in the head block 39, and surrounding this tube 37 is a larger tube 39ª having one end preferably threaded into the acetylene inlet aperture 40 in the head block. The other end of the tube 39ª is preferably connected to the acetylene outlet recess 14 by a short sleeve 41 which surrounds the adjacent end of the tube 39ª, and is soldered thereto after its other end has been adjusted in the acetylene outlet 14 and likewise secured in place by soldering. This sleeve 41 is provided with an annular shoulder 42 which co-acts with the adjacent surface of the valve casting 10 to prevent the sleeve 41 being possibly inserted far enough to close the bore 36. The cap 43 threaded on the end of the handle tube 12 and snugly fitting on the tube 39ª serves to secure the handle 12 in position relative to the tube 39ª.

The oxygen passage through the tube 37 is connected by the bore 44 in the head block 39 with the outlet recess 45 formed in said block, and the outer portion of this cylindrical recess is threaded, as seen in Fig. 3, to secure in place the corresponding end of the tip 46 which is screwed in place, and which has some form of an abutment 47 associated therewith to engage the block 39 and prevent the top being screwed in too far. As shown, this tip has a bore extending through its length, entrance to said bore at the inner end being preferably had through the small passages 48 formed therein, as seen in Fig. 4. As this tip has an enlarged expansion chamber portion 49, I conveniently provide for constructing this portion by closing the inner end of the tip by the plug 50 threaded therein and having the radial passages 48 bored therein as will be readily understood. Beyond the outlet recess 45 is formed another larger and preferably concentric recess 51, to accommodate the shoulder 52 formed on the tip 46, and having a plurality of slanting and radial passages 53 drilled therein so that the acetylene delivered to the annular chamber formed between the recess 51 and the adjacent wall of the tip can pass into the tip. The acetylene passes from the tube 39ª into this annular chamber through the bore 54. The outer end of this annular chamber is closed and made gas-tight by the compression ring 55, triangular in cross section, which fits therein, and which is forced in place so as to be air-tight by the gland nut 56 threaded on the adjacent end of the block 39. This gland nut 56 is preferably hexagonal or octagonal in cross section so as to take a wrench, and the exterior of the tip 46 at 57 is likewise hexagonal so that a wrench can be applied to it.

The operation of the apparatus will be perfectly apparent: The oxygen supply is adjusted by the handle 22 and the acetylene supply by the handle 32, and the two gases pass to the tip where they are mixed in the tip after the acetylene passes through the passages 53.

I noted the fact that the tube 37 is not straight, but is bent. It is purposely bent in order to prevent any possibility of its being pulled loose from its fastenings at either end by reason of the expansion of the tube 39, which, being exposed to the heat of the operation expands more than the tube 37, if the latter can be said to expand at all. I have found this simple expedient a desirable means of overcoming a difficulty which I have experienced due to the unequal expansion of these two tubes.

In Fig. 4 I have illustrated a cutting tip 58 substituted for the welding tip 46 shown in Figs. 2 and 3, and with this cutting tip the bore 59 from the passage 44 to the center of the outlet recess 45 (which is closed by the projection 47 of the welding tip 46) comes into play, and serves to admit the high pressure oxygen to the central bore 60 extending through the length of the tip. With this cutting tip 58, the eccentric bores 61 for the mixture low pressure oxygen have their upper ends 62 made so fine that they will choke down the high pressure oxygen entering them so that it is in effect low pressure oxygen when it leaves them and enters the larger bores 61. These fine passages 62 take the place of the reducing valve customarily associated with the handle of cutting torches. With this tip 58, the acetylene from the bore 54 passes into the annular chamber 51 as before, and passes through the radial bores 63 like the bores 53 of the tip 46, but each bore 63 terminates in its associated eccentric bore 61, so that the acetylene and low pressure oxygen are mixed in the bores 61 below the bores 63. Except for the noted differences in the bores, the cutting tip 58 is substantially the same as the welding tip, as it has the reduced end above the threaded portion, and the cylindrical portion cooperating with the compression ring 55 and the gland nut 56, and the hexagonal portion 57 by which it can be turned to screw it in place.

While I have shown and described my invention as embodied in the form which I at present consider best adapted to carry out its purpose, it will be understood that it is capable of modifications, and that I do not desire to be limited in the interpretation of the following claims except as may be necessitated by the state of the prior art.

What I claim as new, and desire to secure by Letters Patent of the United States is:

1. In a torch, the combination with a valve casing provided with two passages therethrough and two valves controlling said passages, one of said passages having its outlet within and concentric to the outlet of the other passage, which outlet consists of a large circular recess formed in the outlet end of the casing into which said other passage opens at its periphery, of a tube secured in the smaller outlet, a larger tube surrounding the first, and a short sleeve bridging the space from the end of the larger tube to the larger outlet and having a shoulder to prevent its being inserted therein far enough to close the passage, and adapted to be secured at its ends to the tube and to the casing respectively.

2. In a torch, the combination with a head block having two passages therethrough, of a tube connected to the inlet end of one passage, a second tube connected to the inlet end of the other passage, one of said passages terminating in an enlarged internally threaded outlet portion, and the other in a still larger annular outlet portion concentric with the other outlet portion, a tip having its inner end threaded to cooperate with said internally threaded outlet portion and provided with a stop to limit the extent to which it can be screwed in and having a central passage opening at both ends thereof, and having a larger portion outside of said threaded portion, and having radial passages leading from the offset between the threaded portion and the said larger portion toward the central passage, a compression sleeve fitting in the end of the head block about the tip, and a nut threaded on the block and engaging the compression sleeve.

3. In a torch, the combination with a head block having two passages therethrough, of a tube connected to the inlet end of one passage, a second tube connected to the inlet end of the other passage, one of said passages terminating in an enlarged internally threaded outlet portion, and the other in a still larger annular outlet portion concentric with the other outlet portion, a tip having its inner end threaded to cooperate with said internally threaded outlet portion and provided with a stop to limit the extent to which it can be screwed in and having a central passage opening at both ends thereof, and having a larger portion outside of said threaded portion, and having radial passages leading from the offset between the threaded portion and the said larger portion toward the central passage, a compression sleeve fitting in the end of the head block about the tip, and a nut threaded on the block and engaging the compression sleeve, said tip having the central portion of the central passage of a larger diameter to form an expansion chamber for the mixed gases.

In witness whereof, I have hereunto set my hand this 7th day of October, 1924.

ROBERT D. McINTOSH.